(12) United States Patent
Vosburgh et al.

(10) Patent No.: US 12,553,976 B1
(45) Date of Patent: *Feb. 17, 2026

(54) DEVICES, SYSTEMS, AND METHODS FOR COUNTERING DRONE COUNTERMEASURES

(71) Applicant: Archaius Inc., Durham, NC (US)

(72) Inventors: Frederick Vosburgh, Durham, NC (US); Kristopher McGuire, Raleigh, NC (US); Lee B. Baker, Raleigh, NC (US)

(73) Assignee: Archaius Inc., Durham, NC (US)

( * ) Notice: Subject to any disclaimer, the term of this patent is extended or adjusted under 35 U.S.C. 154(b) by 215 days.

This patent is subject to a terminal disclaimer.

(21) Appl. No.: 18/238,152

(22) Filed: Aug. 25, 2023

Related U.S. Application Data (63) Continuation-in-part of application No. 18/222,184, filed on Jul. 14, 2023, now Pat. No. 12,339,392.

(60) Provisional application No. 63/447,771, filed on Feb. 23, 2023.

(51) Int. Cl.
| | | |
|---|---|---|
| *G07C 5/00* | (2006.01) | |
| *G01S 3/04* | (2006.01) | |
| *G07C 5/02* | (2006.01) | |
| *G07C 5/04* | (2006.01) | |
| *G07C 5/08* | (2006.01) | |
| *B64U 101/17* | (2023.01) | |
| *G01S 19/21* | (2010.01) | |

(52) U.S. Cl.
CPC .......... *G01S 3/043* (2013.01); *B64U 2101/17* (2023.01); *B64U 2201/20* (2023.01); *G01S 19/21* (2013.01)

(58) Field of Classification Search
CPC .......... F41G 7/2253; G01S 3/48; G01S 19/21; B64U 10/00; B64U 2101/15
See application file for complete search history.

(56) References Cited

U.S. PATENT DOCUMENTS

| | | | |
|---|---|---|---|
| 3,964,065 A | | 6/1976 | Roberts et al. |
| 5,355,767 A | * | 10/1994 | Morita ...................... F41G 3/14 |
| | | | 342/419 |
| 5,440,308 A | | 8/1995 | Dybdal et al. |
| 5,440,636 A | | 8/1995 | Herrick |

(Continued)

FOREIGN PATENT DOCUMENTS

| | | |
|---|---|---|
| CN | 204856097 U | 12/2015 |
| CN | 111707447 A | 9/2020 |

(Continued)

OTHER PUBLICATIONS

Drake et al., "Single Channel Multiple Signal Classification Using Pseudo-Doppler" IEEE Signal Processing Letters vol. 30, 1587-1591 (Oct. 26, 2023).

(Continued)

*Primary Examiner* — Kito R Robinson
*Assistant Examiner* — Anthony Gabriel Mora
(74) *Attorney, Agent, or Firm* — NEO IP (57) ABSTRACT

A navigation system and method for guiding a vehicle with respect to a source of jamming is disclosed, the system and method being capable of receiving navigation-aid signals, detecting jamming of such signals, mitigating such jamming, determining direction to the source of jamming, and interdicting that source, e.g., a drone gun.

14 Claims, 5 Drawing Sheets

(56) References Cited

U.S. PATENT DOCUMENTS

| | | | |
|---|---|---|---|
| 6,590,528 B1 | 7/2003 | DeWulf | |
| 6,847,328 B1 * | 1/2005 | Libonati | H01Q 9/0407 |
| | | | 343/797 |
| 6,861,983 B2 | 3/2005 | Casabona et al. | |
| H2224 H | 10/2008 | Madden | |
| 7,733,288 B2 | 6/2010 | Williams | |
| 8,125,398 B1 | 2/2012 | Paulsen | |
| 8,965,319 B2 | 2/2015 | Wilkerson et al. | |
| 9,519,062 B2 | 12/2016 | Vosburgh et al. | |
| 10,330,769 B1 | 6/2019 | Mayer et al. | |
| 10,581,155 B1 | 3/2020 | Gradinaru et al. | |
| 10,735,037 B2 | 8/2020 | Floyd et al. | |
| 10,868,609 B1 * | 12/2020 | Kossin | H04B 7/10 |
| 10,922,982 B2 | 2/2021 | Magdaleno | |
| 2002/0015439 A1 | 2/2002 | Kohli et al. | |
| 2003/0031279 A1 | 2/2003 | Blount et al. | |
| 2010/0007555 A1 | 1/2010 | Ezal et al. | |
| 2010/0045506 A1 * | 2/2010 | Law | G01S 19/21 |
| | | | 342/13 |
| 2012/0252392 A1 | 10/2012 | Wilkerson et al. | |
| 2014/0152499 A1 * | 6/2014 | Vosburgh | H01Q 21/28 |
| | | | 342/357.59 |
| 2015/0349432 A1 | 12/2015 | Vosburgh | |
| 2016/0349375 A1 * | 12/2016 | Littlefield | G01S 5/06 |
| 2017/0261999 A1 * | 9/2017 | Van Voorst | G08G 5/22 |
| 2017/0293265 A1 | 10/2017 | Salle et al. | |
| 2018/0375487 A1 | 12/2018 | Chen et al. | |
| 2019/0259280 A1 | 8/2019 | Lamkin et al. | |
| 2019/0372725 A1 | 12/2019 | Hongo | |
| 2020/0005656 A1 | 1/2020 | Saunamaeki | |
| 2020/0102074 A1 | 4/2020 | Kinsley et al. | |
| 2020/0169287 A1 * | 5/2020 | Kim | H04B 1/525 |
| 2021/0018936 A1 * | 1/2021 | Di Pietro | H04K 3/22 |
| 2021/0173036 A1 | 6/2021 | Guezelarslan et al. | |
| 2021/0248488 A1 | 8/2021 | Naseef | |
| 2022/0014205 A1 | 1/2022 | Petrov et al. | |
| 2022/0163676 A1 | 5/2022 | Amarnathan | |
| 2022/0285845 A1 | 9/2022 | Panther et al. | |
| 2022/0324572 A1 | 10/2022 | Alzahrani | |
| 2022/0397375 A1 * | 12/2022 | Hyman | H04K 3/224 |
| 2025/0116488 A1 * | 4/2025 | Branco Ferreira | H04K 3/90 |

FOREIGN PATENT DOCUMENTS

| | | |
|---|---|---|
| KR | 20170070816 A | 6/2017 |
| KR | 102428558 B1 | 8/2022 |

OTHER PUBLICATIONS

Peavey et al., "The single channel interferometer using a pseudo-Doppler direction finding system," IEEE International Conference on Acoustics, Speech, and Signal Processing, Munich, Germany, (Apr. 21, 1997).

18222184_Dec. 9, 2024_CN_ 111707447 A_M.pdf, machine translation of CN-111707447-A (Year: 2020).

18222184_Dec. 10, 2024_KR_20170070816_A_M.pdf, machine translation of KR-20170070816-A (Year: 2016).

Gangil Byun, Hosung Choo, and Sunwoo Kim, "Improvement of Pattern Null Depth and Width Using a Curved Array With Two Subarrays for CRPA Systems", IEEE Transactions on Antennas and Propagation, vol. 63, No. 6, Jun. 2015, pp. 2824-2827.

Sidney P. Applebaum, "Adaptive Arrays", IEEE Transactions on Anennas and Propagation, vol. AP-24, KO. 5, Sep. 1976, pp. 585-598.

U.S. Appl. No. 18/222,184, filed Jul. 14, 2023, titled "Devices, Systems, and Methods for Cancellation Bandwidth—Adjustable Nulling of Interference".

\* cited by examiner

DEVICES, SYSTEMS, AND METHODS FOR COUNTERING DRONE COUNTERMEASURES

CROSS-REFERENCE TO RELATED APPLICATIONS

This application is related to and claims priority from the following US patents and patent applications: this application is a continuation-in-part of U.S. patent application Ser. No. 18/222,184, filed Jul. 14, 2023, which claims priority from and the benefit of U.S. Provisional Patent Application No. 63/447,771, filed Feb. 23, 2023. Each of the above applications is incorporated herein reference in its entirety.

BACKGROUND OF THE INVENTION

1. Field of the Invention

This disclosure relates to guided vehicles and their navigation systems. More specifically, it relates to vehicle with navigation systems that are operable to mitigate jamming and interdict its source.

2. Description of the Prior Art

The introduction of GPS guidance in the late 1980's transformed warfare. Today, warfare is being fundamentally change again by the emergence of unmanned or remotely piloted vehicles (hereinafter drones) as inexpensive platforms for intelligence, surveillance and reconnaissance (ISR) and of mobile jamming devices referred to as drone guns, which have proven quite effective in defeating drones by disrupting their reception of GPS and command and control signals, causing them to crash.

While larger vehicles can afford the high size weight power (SWAP) and cost burdens of today's controlled radiation pattern array (CRPA) antennas, quadcopters and other drones cannot, thereby exposing them to a punishing attrition rate on the battlefield, primarily at the hands of portable drone-countermeasures known as drone guns.

CRPA create nulls that are wide in the spatial domain and narrow in the spectral domain, both of which reduce their performance. Broad spatial nulls are indiscriminate, cancelling signals of interest (SOI) over a wide area of the sky around a source of jamming. That also limits their ability to determine the origin of a jammer. And, CRPA nulls, despite efforts to expand their spectral width (e.g., in "Improvement of Pattern Null Depth and Width Using a Curved Array With Two Subarrays for CRPA Systems" by Byun et al. (2015)), are unacceptably narrow in an era of broadband signals like GPS M-Code and Wi-Fi among other signals.

Ground attack missiles can afford the SWAP and cost of GPS anti-jamming antennas, but the predictable loss of guidance to jamming drives a requirement for terminal homing signals, e.g., a radar or laser reflection from the target, without which accurate delivery on target is uncertain. While missiles could, in principle, be used against drone guns, their high cost makes it impractical.

U.S. Pat. No. 8,125,398 by Paulsen discloses GPS-guided artillery shells having a nose-mounted forward-looking antenna and a circumferentially exposed slot antenna aft of the nose. The nose mounted antenna is omni-directional and therefore immune to amplitude variation caused by rotation of the shell in flight. The slot antenna has a gain pattern that does not overlap that of the nose-mounted antenna, and has an on-axis phase center for receiving signals without rotation-induced modulation of amplitude or phase of the received signal induced by spinning of the shell, but neither antenna defends against jamming. Paulsen also teaches aft-looking reception of remote-control signals. In any case, neither antenna provides protection against jamming.

U.S. Pat. No. 6,861,983 disclosed by Casabona et al describes methods and apparatus for improving reception of GPS signals by vehicles subject to pitch or roll while traveling on uneven ground by combining signals from two orthogonally oriented antennas to maintain received signal strength to compensate for the effect of rolling.

U.S. Pat. No. 7,733,288 by Williams discloses the use of antennas arranged between a receive antenna and source of interference, such as a co-site transmit antenna, to selectively absorb the transmission, thereby improving the relative strength of desirably received signals.

U.S. Pat. No. 10,735,037 for tunable filters, cancellers, and duplexers by Floyd, et al., teaches use of passive mixers to cancel self-interference of wireless transmit signals that couple into a receive antenna, thereby interfering with reception of SOI such as mobile phone signals. The disclosed method uses a copy of the transmit signal, including distortion generated by the power amplifier, which is compensated and combined with the received signal to selectively cancel the transmit signals including its distortion.

U.S. Pat. No. 8,965,319 by Wilkerson at al. (2015) discloses methods and devices for reducing radio frequency interference by deterministic, feed-forward cancellation of even saturating jamming signals to selectively isolate radio frequency (RF) signals of interest (SOI). The disclosed method also includes the finding of the direction to a source of jamming superior other anti-jamming antennas.

U.S. Pat. No. 9,519,062 by Vosburgh et al discloses devices and methods for cancelling in-band interference of global positioning system (GPS) signals using evanescent fields to cancel jamming before it enters the receive antenna vs. canceling it after the fact. While this invention provides deep nulls, time delay due to the system design results in a narrow cancellation bandwidth, limiting its effectiveness against wideband interference.

Given the importance of drones and the ubiquity of drone guns on the battlefield, we propose drones having a navigation system that allows them to navigate by GPS or remote-control, to defeat jamming of such signals, and to navigate, such as homing, even in the face of disruptive jamming to interdict a drone gun or other sources of jamming, providing a low cost/high value vehicle that addresses emerging requirements of modern warfare.

The current disclosure of cancellation provides anti-jamming nulls that are wide in the spectral domain and narrow in the spatial domain, and have a SWAP low enough even for drones, addressing the shortcomings of prior anti-jamming systems.

SUMMARY OF THE INVENTION

The present invention relates to autonomous or remote-controlled vehicles having anti-jamming systems for isolation of radio frequency (RF) signals of interest (SOI) from interference (hereinafter "jamming") by selective cancellation, and, more specifically adjusting Time Difference of Arrival (TDOA) of antenna signals at a signal combiner for adjusting cancellation bandwidth.

In one embodiment, the anti-jamming antenna system is of symmetric design in which a first antenna is connected to the first input of a combiner via a signal path comprising a controllable delay element and a phase rotator connected in series between the first antenna and the combiner, and at least one second antenna is connected to a second input of the combiner via a signal path comprising a controllable delay element and a phase rotator connected to series between the second antenna and the combiner. A power detector is connected between the output of combiner and the system controller, to the first signal path and the second signal path. The method comprises rotating phase according to the method described in U.S. Pat. No. 9,519,062, which is incorporated herein by reference in its entirety, together with setting TDOA according to a desired or predetermined cancellation bandwidth.

In another embodiment, the system comprises an asymmetric design in which the at least one second signal path differs from first signal path with respect to one or more of the components and/or propagation time.

In a third embodiment, the system comprises a plurality of stages in one embodiment comprising a first canceller and a second canceller, the outputs of which are connected to a third canceller in a cascade like design for providing additional cancellation of a first jammer or cancellation of a second jammer. This system is operable to be extended to additional stages for cancellation of a plurality of jammers.

In a fourth embodiment, the system comprises a cancellation bandwidth adjustable controlled radiation pattern array (CRPA) in which each signal path has a controllable delay element connected in series with a transversal filter that is further connected to the combiner. In some cases, a third signal path comprises a controllable switch for reversible interruption of propagation of a signal to the combiner.

In addition to control of amplitude and phase as disclosed in referenced patents, e.g., U.S. Pat. No. 9,519,062, the current disclosure teaches control of spectral bandwidth, or cancellation Band Width (CBW), by precise feed-forward control of time difference of arrival (TDOA) at the system combiner. For example, TDOA might be adjusted to some 800 picoseconds to provide a narrow CBW, e.g., 2 MHz, while at TDOA of 80 picoseconds would provide a 20 MHz CBW or an 8 picosecond TDOA would provide a 200 MHz CBW.

In some cases, TDOA control can be conducted for the modified CRPA antennas described herein, finding jammer direction, e.g., using two antenna signals according to '062, with the result used with the geometry of the array to determine adjustments of arrival times among the antennas to yield the desired CBW. In some cases, the method is used to form a null that is deeper and/or wider. In this way, the disclosed method can eliminate the need to solve for weightings of the multiple taps in each transversal filter, allowing instead the use of a single I/Q circuit in each signal path, greatly reducing computational demand and SWAP while improving protection against jamming.

These and other aspects of the present invention will become apparent to those skilled in the art after a reading of the following description and figures elucidating the invention.

DETAILED DESCRIPTION

The term drone is used here to describe any unmanned vehicle, including quadcopters ballistic projectiles and remotely piloted vehicles. Although described in terms of drones, drone guns and GPS, this disclosure is intended cover piloted vehicles, as well as reception of any type of RF signal.

Homing is defined as navigating towards a source of interference signals or jamming. Interdiction encompasses any device or method that reduces the effectiveness or operability of a source of jamming. Navigation aiding signals include GPS and other satellite signals, command and control signals, emissions from radio towers or beacons, among others.

Figure 1:
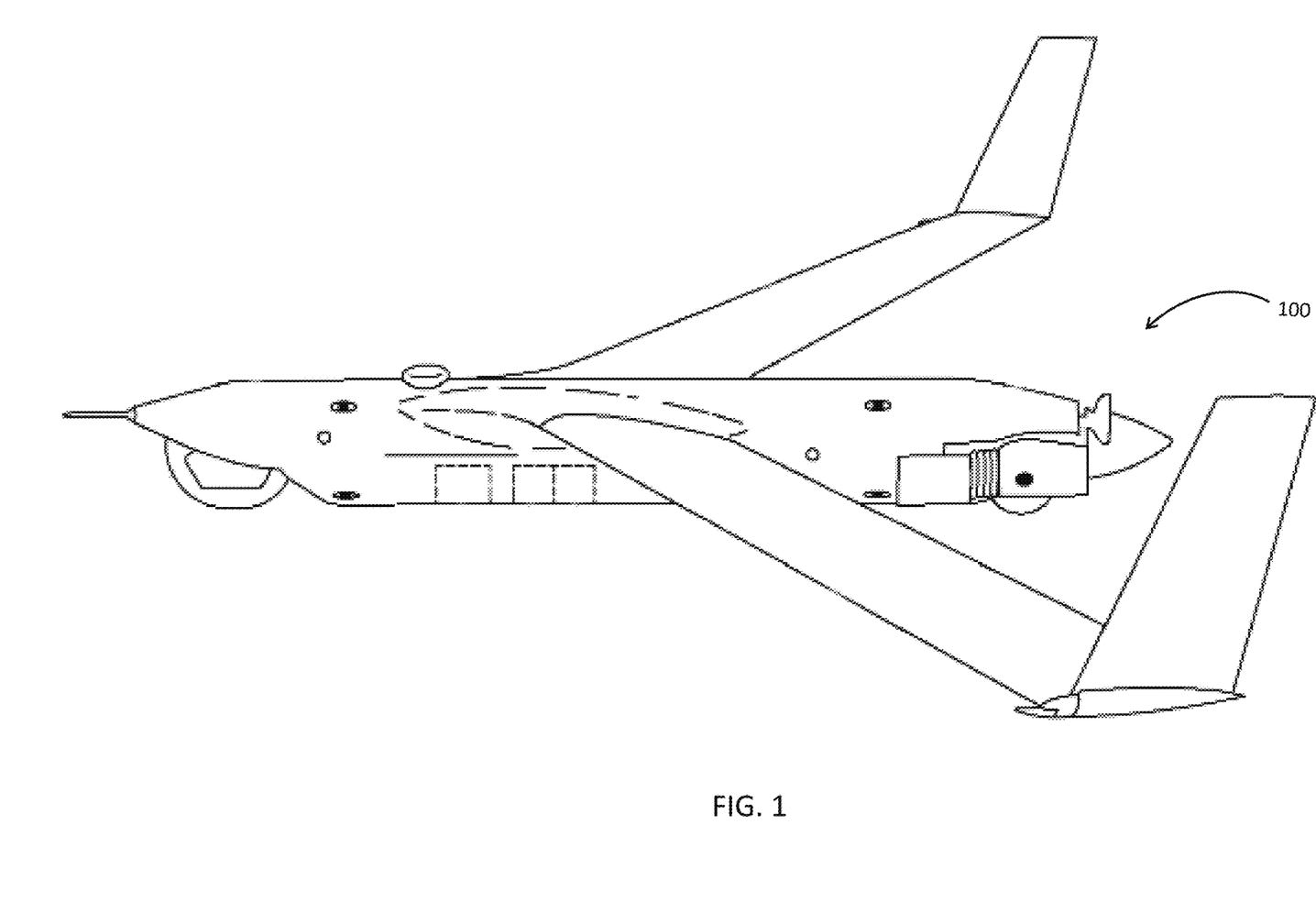
FIG. 1 illustrates an unmanned vehicle comprising a multi-purpose navigation system

FIG. 1 depicts an unmanned vehicle 100 including a navigation system that can mitigate and/or interdict jamming. The system consists of an adaptive anti-jamming antenna including a controller; the controller is operable to also serve as a guidance navigation and control (GNC) unit. The system includes, or may be connected to, an interdiction device such as an inflammable device or RF emitter, which is operable to be activated by the antenna controller.

The antenna and its method of jammer cancellation and direction finding are as described in U.S. Pat. No. 9,519,062, U.S. patent application Ser. No. 18/222,184 and U.S. Provisional Patent Application No. 63/447,771, each of which is incorporated herein by reference in its entirety. Jamming is intended to include any RF signal strong enough to disrupt reception of desirably received navigation, command and control or other RF signals.

The antenna system is operable to find the direction to a source of interference that could or has disrupted reception of navigation or command and control signals. The GNC is any type that is operable to switch between navigating a desired course and homing at a source of jamming according to direction finding signals from the antenna system. Switching between navigation and homing is operable to occur when commanded or when jamming exceeds a preset level. Example of interdiction include: colliding with, exploding proximate and emitting electronic attack signals.

Figure 2:
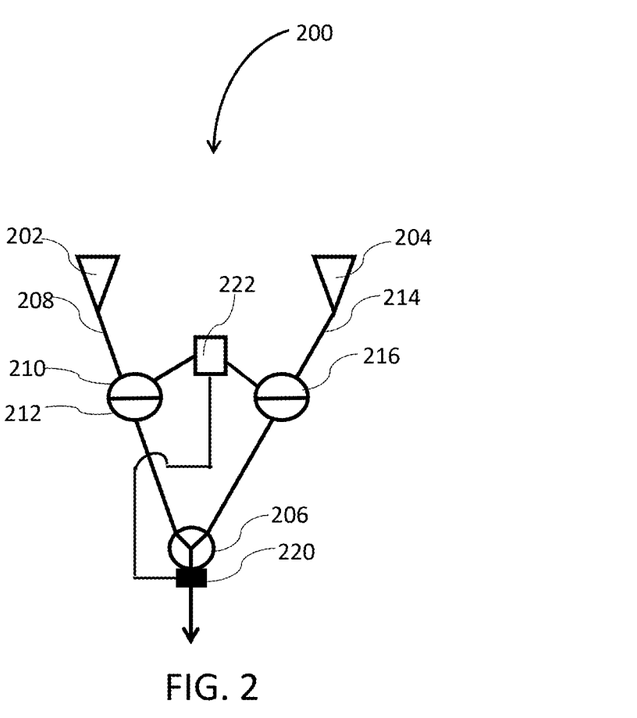
FIG. 2 illustrates a multi-purpose navigation system for canceling jamming signals and interdicting their source

FIG. 2 is a block diagram of one embodiment of the antenna system 200, comprising a first antenna 202 connected to a cancelling combiner 206 by a first signal path 208 conducting a first antenna signal and a second antenna connected to the combiner 206 by a second signal path 214 conducting a second antenna signal. The first signal path 208 integrates a phase rotator 210 and may integrate a tunable delay line 212. The phase rotator 210 and/or the tunable delay line 212 are connected to the system controller 222 which is also connected to a power detector 220 also connected to the output of the combiner 206.

The first antenna 202 and second antenna 204 are of any type that are operable to receive at least RF signals such as GPS, data, communications and command and control. In some cases, the system includes a self-destruction device (not shown) of any type that is operable to, for example, wipe digital data or thermally destroy the module as means of protecting against reverse engineering.

The phase rotator 210 is any type that is operable to also equalize amplitude of the first antenna signal to that of the second antenna signal. In some cases, the second signal path 214 incorporates a fixed delay element 216 that is operable to at least partly offset the fixed delay of the first antenna signal induced by the phase rotator and tunable delay line irrespective of their adjustment.

The controller 222 is any type that is operable to calculate anti-phase alignment of the first antenna signal with the second antenna signal at the combiner as means of finding direction to the source of even disruptive jamming as means of directing homing at the source of jamming.

Figure 3:
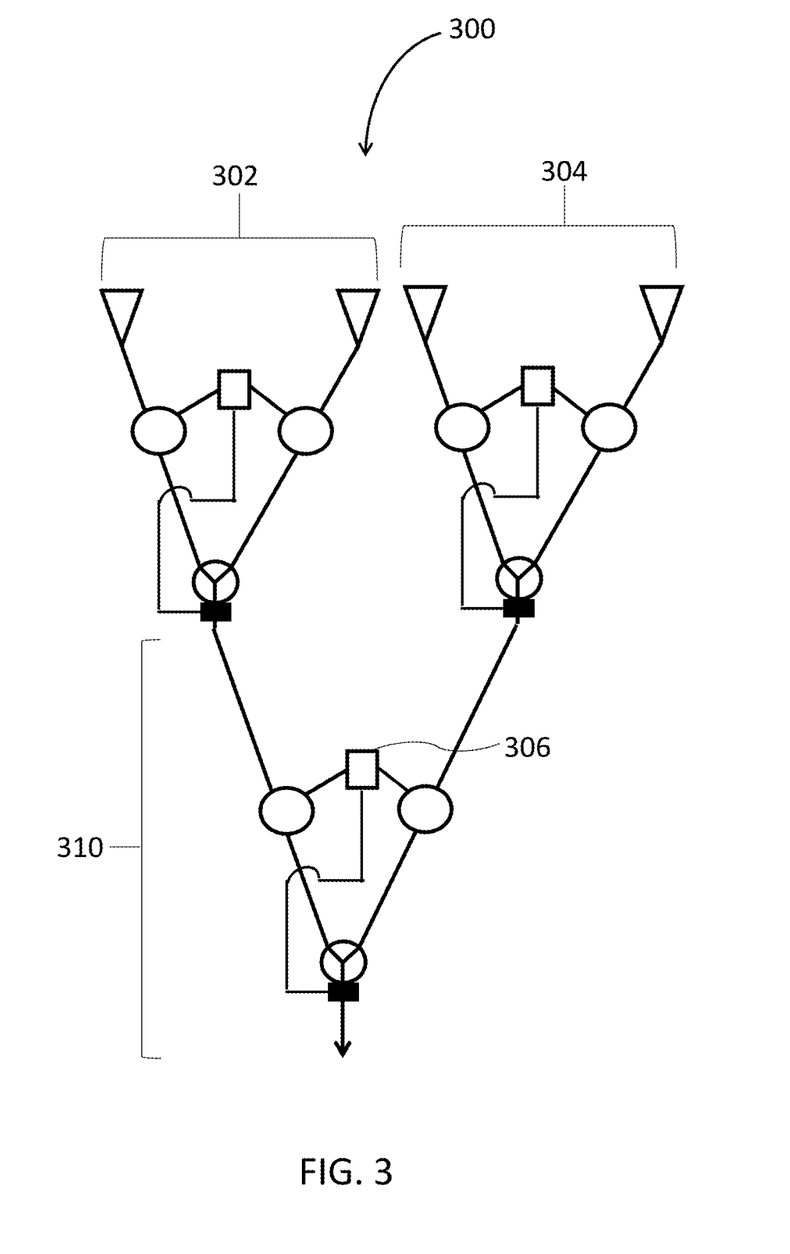
FIG. 3 illustrates a multi-purpose navigation system for multiple canceling of jamming signals and interdicting one source of such signals.

FIG. 3 depicts a two-stage anti-jamming antenna system 300, the second stage 310 operative to provide additional cancellation of a jammer 302 or to provide cancellation of a different jammer 304. As an example of canceling two different jammers, the first stage could cancel Wi-Fi jamming and the second stage could cancel GPS jamming. The controller 306 is any type that is operable to be programmed to switch to homing against a predetermined type of jamming, e.g., Wi-Fi or GPS.

Figure 4:
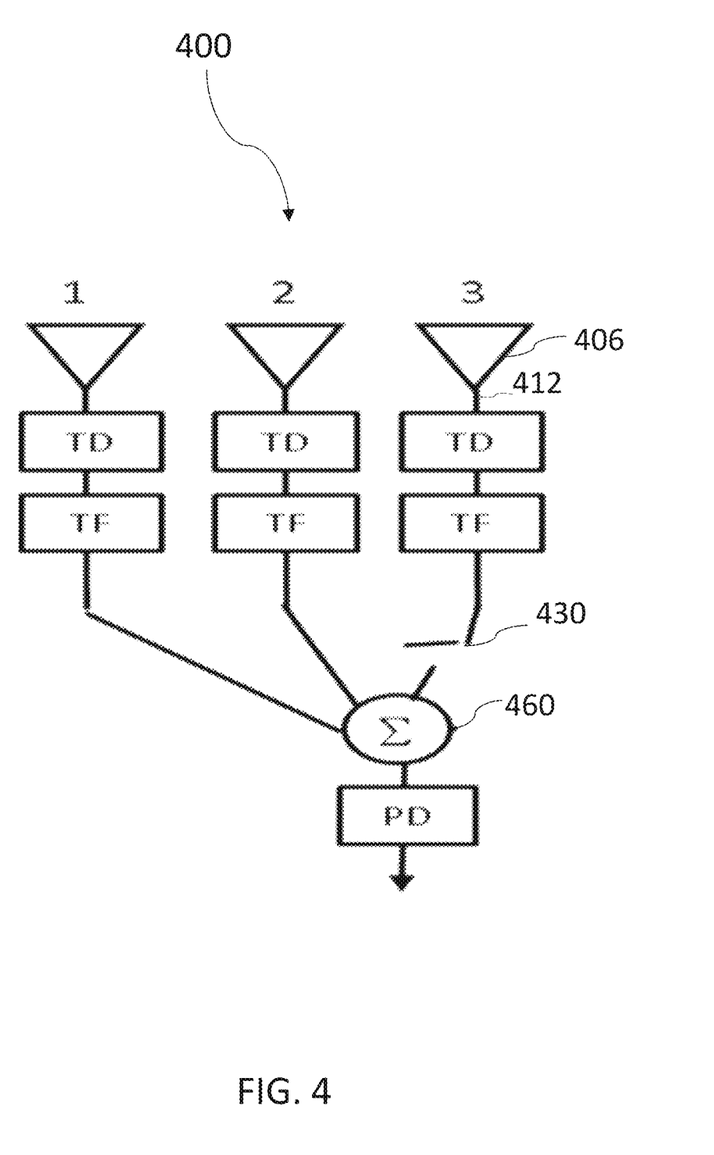
FIG. 4 illustrates a CRPA type antenna array with enhanced direction finding for integration in the system.

FIG. 4 depicts a direction-finding type CRPA 400 comprising at least one third antenna 406 connected to the combiner 460 via an at least one third signal path 412 which integrates a switch 430 that is operable to interrupt conduction of the third antenna signal as means of limiting to two the signals reaching the combiner 460 to support calculation of anti-jamming phase shift and, thereby, jammer bearing according to U.S. patent application Ser. No. 18/222,184.

Figure 5:
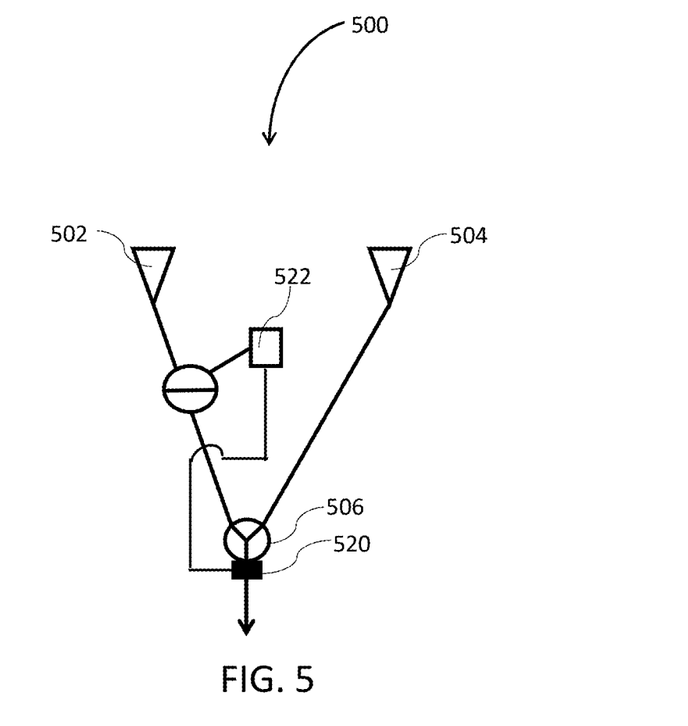
FIG. 5 illustrates another embodiment of the GADm module comprising a first antenna and a second antenna each connected to a combiner that is further connected to a power detector that is also connected to a controller of any type that is operable to steer the drone in the direction of a source of jamming or in a direction relative to the direction to that source.

FIG. 5 depicts another embodiment of the GADm module 500 comprising a first antenna 502 and a second antenna 504 each connected to a combiner 506 that is further connected to a power detector 520 that is also connected to a controller 522 of any type that is operable to steer the drone in the direction of a source of jamming or in a direction relative to the direction to that source. The system processor is any type that is operable to determine current location by processing signals from the combiner 506. The processor (not shown) is operable to assess current location relative to a desired location or track and, as appropriate, issues updates to vehicle control element so the difference between the current and desired locations is reduced. In some cases, the processor is connected to an inertial measurement unit or system (not shown) that is operable to extrapolate current position from GPS and/or prior location data. In one embodiment, a GPS processor die (not shown) is integrated into the GADm module.

The first signal path is operable to integrate an inverting amplifier as means of anti-phase shifting the first antenna signal. In such cases, the module is any type that is operable to steer a drone in the direction of a jammer source by minimizing the output power from the signal combiner. In cases lacking an inverting amplifier, homing on the source of jamming is controlled by steering to maximize combiner output power. In some cases, the connection between the first antenna and the combiner may comprise at least one of a delay element and a phase rotator of any type that is operable to alter the magnitude of power of the signal detected by the power detector.

A method of the invention comprises sequential steps of: receiving navigation signals, guiding a vehicle, detecting jamming, mitigating jamming, finding the direction to the source of jamming, navigating with respect to that source. Navigating relative to that source includes homing on and interdicting it by kinetic or other means. The method includes self-destruction of the module when the battery is nearly exhausted, unless over overridden by a command from the user.

The method also encompasses navigating in another direction using the source of jamming in a manner analogous to the VOR transmitters used in navigation by aircraft pilots. The method includes providing data to another device, such as another vehicle or weapon, to assist its navigation and/or interdiction of the source. The method is operable to determine jamming direction by adjusting tunable delay to substantially reduce the time difference of arrival of antenna signals at the combiner as an indicator of jammer bearing, as commonly practiced in array antenna steering.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for navigating with respect to at least one of navigation-aid signal and jamming thereof, comprising:
   an antenna array including a first antenna and a second antenna, each responsive to jammer burdened navigation signals,
   the first antenna being connected to a signal combiner via a first signal path and the second antenna also connected via a second signal path to the signal combiner,
   the combiner output being connected to a power detector that is also connected to a receiver and to a guidance navigation and control type controller that is further connected to at least one element of the first signal path,
   the first signal path integrating at least one of a phase rotator and a tunable delay line,
   the controller being any type that is operable to calculate a delay value of the tunable delay line based on a time difference of arrival (TDOA) of the first signal path and the second signal path at the signal combiner,
   the controller being any type that is operable to determine at least one vehicle parameter of position, velocity and attitude with respect to at least one of the Earth and a source of jamming, and
   the controller being any type that is operable to determine direction to a source of jamming and navigate a vehicle in that direction, as means of providing at least one of guided navigation, jammer mitigation, source-relative transit, and target interdiction,
   wherein the controller is operable to home the vehicle in the direction of the source of jamming by steering the vehicle to maximize output power of the signal combiner.

2. The system of claim 1, in which the second signal path integrates a fixed delay element.

3. The system of claim 1, in which the second signal path integrates a second phase rotator between the second antenna and the combiner.

4. The system of claim 3, in which the first signal path integrates a first attenuator between the first antenna and the first phase rotator and the second signal path integrates a second attenuator between the second antenna and the second phase rotator.

5. The system of claim 1, further comprising a staged type comprising at least 4 antennas connected in pairs to two combiners the outputs of which can be further combined to provide at least one of: further cancelation of a first jammer and cancellation of a second jammer.

6. The system of claim 1, in which the antenna array further comprises at least one third antenna connected to the combiner via an interruptible signal to form an enhanced direction finding CRPA antenna.

7. The system of claim 1, in which source-relative transit is conducted by providing navigation data to a third device of any type that is operable to interdict or navigate with respect to the source of jamming.

8. The system of claim 1, further including at least one drone operable to target and engage the source of jamming based on the determined direction to the source of jamming.

9. The system of claim 8, wherein the source of jamming includes a drone gun.

10. The system of claim 1, further comprising a GPS type processor.

11. A system for navigating with respect to at least one of navigation-aid signal and jamming thereof, comprising:
    an antenna array including a first antenna and a second antenna, wherein the first antenna and the second antenna are responsive to jammer burdened navigation signals;
    wherein the first antenna is connected to a signal combiner via a first signal path, wherein the second antenna is connected to the signal combiner via a second signal path;
    wherein the combiner output is connected to a power detector;
    wherein the power detector is connected to a receiver and to a guidance navigation and control type controller;
    wherein the controller is connected to at least one element of the first signal path;
    wherein the first signal path integrates an inverting amplifier and at least one phase rotator and/or at least one tunable delay line;
    wherein the controller is operable to calculate a delay value of the tunable delay line based on a time difference of arrival (TDOA) of the first signal path and the second signal path at the signal combiner;
    wherein the controller is operable to determine a direction to a source of jamming and navigate a vehicle in the direction to the source of jamming; and
    wherein the controller is operable to home the vehicle in the direction of the source of jamming by steering the vehicle to minimize output power of the signal combiner.

12. The system of claim 11, further comprising a staged type comprising at least 4 antennas connected in pairs to two combiners, the outputs of which can be further combined to provide at least one of: further cancelation of a first jammer and cancellation of a second jammer.

13. The system of claim 11, wherein the antenna array further comprises at least one third antenna connected to the signal combiner via an interruptible signal to form an enhanced direction finding CRPA antenna.

14. The system of claim 11, wherein the second signal path integrates a fixed delay element.

* * * * *